United States Patent Office 2,867,230
Patented Jan. 6, 1959

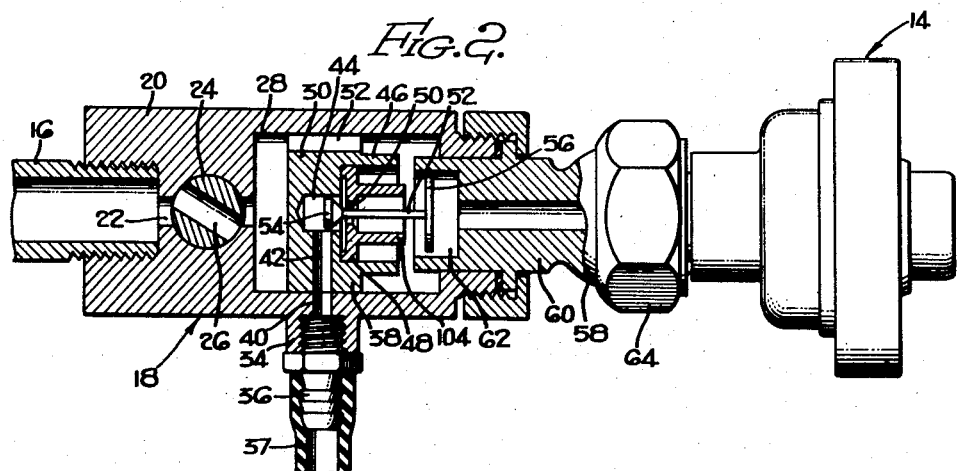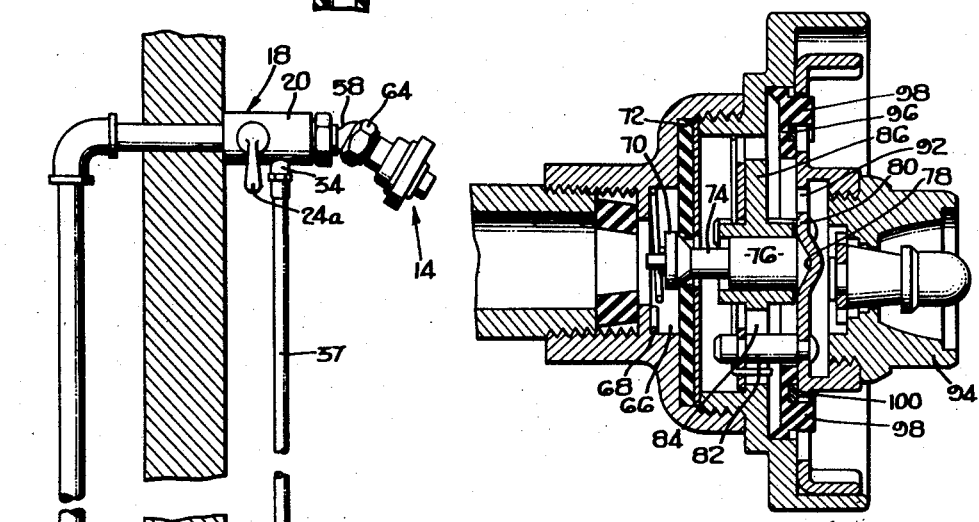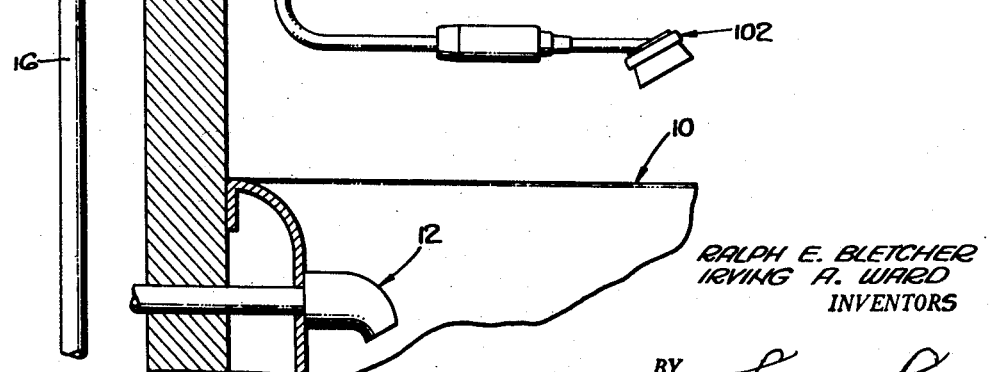

2,867,230

DIVERTER VALVE FOR A SHOWER INSTALLATION

Ralph E. Bletcher and Irving A. Ward, Los Angeles, Calif., assignors of small percentages to various assignees Application April 25, 1955, Serial No. 503,517

2 Claims. (Cl. 137—119)

This invention relates to a shower installation.

It is an object of this invention to provide a shower installation having multiple outlets.

It is a further object of this invention to provide a shower installation wherein water is discharged through one of multiple outlets at a time.

It is still a further object of this invention to provide a volume control independent of the hot and cold water inlets to permit tempering of the water discharge in a shower installation and then increasing the volume without moving the hot and cold water control valves.

Other objects and advantages of this invention will be readily apparent from the following description.

In the drawings:

Figure 1 is a side elevation of a shower installation embodying this invention.

Figure 2 is a side elevation partially in section of the flow control unit.

Figure 3 is a sectional view of the showerhead.

The installation illustrated is a tub shower installation. The tub 10 has the conventional spout outlet 12 and an overhead shower generally designated 14. Water is supplied to the shower through pipe 16 which water is a mixture of hot and cold water controlled by the conventional valves. Water from pipe 16 flows through the diverter generally designated 18. The housing 20 is threaded at one end to receive pipe 16 and has a water passageway 22 communicating with said pipe. A plug 24 having a central bore 26 is positioned in passageway 22 and is rotated by means of handle 24a to control the volume of water flowing through passageway 22 independent of the hot and cold water control valves.

After passing through passageway 22 water enters chamber 28. Mounted in chamber 28 in this embodiment, soldered therein, is a spider 30 which has ports such as 32 therethrough. The housing 20 has in internally threaded nipple 34 receiving an adapter 36 upon which one end of the hand spray outlet hose 37 is mounted. The spider 30 has an enlarged leg 38 which covers the opening 40 communicating chamber 28 with hose 37. The leg 38 has a port 42 therein which communicates with opening 40 and the open central chamber 44 of the spider. The spider has a tubular extension 46 which projects into chamber 28 surrounding the open end of chamber 44 and forming a seat for washer 48. The washer 48 has a central aperture 50 through which valve stem 52 projects. On the extremity of valve stem 52 adjacent chamber 44 is a valve head 54 and on the opposite extremity a piston 56.

The showerhead 14 is mounted upon a ball 58 which is in turn mounted on the extremity of a cylinder 60 which projects into the externally threaded extremity of housing 20. The extremity of cylinder 60 is recessed to form a chamber 62 into which piston 56 is positioned. The showerhead is secured to ball 58 in the usual manner by its extremity screwing into collar 64 which collar has an internal flange preventing the ball from passing therethrough.

The showerhead in this embodiment is of the self closing type describing our copending application, Serial No. 379,839 "Self Closing Showerhead," now Patent No. 2,789,013. It is to be understood that any showerhead may be utilized which can be shut off manually or otherwise from a point adjacent the outlet. In the particular showerhead illustrated water flows through ball 58 into chamber 66 which has in internal shoulder for spring 68. The spring 68 bears against valve head 70 urging same against valve seat 72 preventing flow through the showerhead. The valve head is mounted on a stem 74 which carries at its opposite extremity cam head 76 which fits into a depression 78 in cam plate 80. When the cam plate is moved the cam head is moved out of the depression urging the valve head 70 against spring 68 opening the valve and permitting flow through the showerhead. The cam plate has a plurality of studs 82 which project through elongated slots 84 in web 86, permitting movement thereof which studs are secured by a lock plate 88 and a loop spring 90 urges the cam plate to the closed position, that is, when cam head 76 is in depression 78 and valve head 70 is seated in valve seat 72. When the cam plate is moved against the urging of spring 90 to the open positon water flows through port 92 and out the showerhead 94 which is screwed into the cam plate. To permit the water pressure to maintain the cam plate in this position a resilient washer 96 is provided having a plurality of projections 98 projecting into elongated slots in the cam plate. A metal washer 100 is positioned between the resilient washer 96 and cam plate 80 to reduce friction. Thus water flow urges the resilient washer 96 and metal washer 100 against the cam plate holding same in the open position. When water flow ceases the spring 90 urges the cam plate 80 to the valve closing position.

Thus when water first flows to the fixture the showerhead 14 is closed and the pressure urges piston 56 and valve head 54 to the left in Figure 2, permitting flow through the spray outlet hose 37, which hose has at its extremity a suitable spray valve 102 of any conventional type. Sleeve 104 on washer or valve seat 48 limits the movement of the piston and valve head. The volume of flow may be reduced by adjustment of the plug valve 24 to permit the user to temper the water as desired.

The showerhead may be opened at the time the water is at the desired temperature so that flow will be through the showerhead. This flow urges piston 56 to the right in Figure 2 so that the valve head 54 seats against valve seat 48 preventing flow through the spray outlet. The plug valve 24 may then be adjusted to increase the volume of flow through the showerhead without changing the tempering of the water.

In this manner a combination shower installation is provided having an overhead shower and a movable hand spray, only one of which will function at a time. The water will discharge out the hand spray when first turned on due to the self-closing feature of the showerhead. It is, of course, possible to change the installation so that water will be supplied to the showerhead when initially the water is supplied and to the hand spray only when desired. This is accomplished by placing the self-closing spray valve on the hand spray outlet and an ordinary showerhead on the shower outlet, and reversing the position of valve head 54 and valve seat 48 with that of piston 56.

While what hereinbefore has been described is the preferred embodiment of this invention, it is readily apparent that alterations and modifications can be resorted to without departing from the scope of this invention and such alterations and modifications are intended to be included within the scope of the appended claims.

We claim:
1. In a shower installation a diverter comprising: a housing having an inlet and a pair of outlets, a chamber in said housing communicating with said outlets and said inlet, a spider in said housing covering the first of said outlets, port means in said spider communicating said first outlet with said chamber, valve means projecting into said port means and piston means connected to said valve means positioned in the other of said outlets, whereby flow through said last mentioned outlet shuts off flow through said first mentioned outlet.

2. In a shower installation a diverter comprising: a housing having an inlet and a pair of outlets, a chamber in said housing communicating with said outlets and said inlet, a spider in said housing covering the first of said outlets, port means in said spider communicating said first outlet with said chamber, valve means projecting into said port means, piston means connected to said valve means positioned in the other of said outlets, whereby flow through said last mentioned outlet shuts off flow through said first mentioned outlet, and volume control means in said housing between said inlet and said spider controlling the volume of flow into said housing.

References Cited in the file of this patent

UNITED STATES PATENTS

| | | |
|---|---|---|
| 1,116,897 | Lehnert | Nov. 10, 1914 |
| 1,256,600 | Schossow | Feb. 19, 1918 |
| 1,318,521 | Wolff | Oct. 14, 1919 |
| 2,091,110 | Smallen | Aug. 24, 1937 |
| 2,610,859 | Wilcox | Sept. 16, 1952 |
| 2,706,487 | Wilson | Apr. 19, 1955 |

Disclaimer 2,867,230.—*Ralph E. Bletcher* and *Irving A. Ward*, Los Angeles, Calif. DIVERTER VALVE FOR A SHOWER INSTALLATION. Patent dated Jan. 6, 1959. Disclaimer filed Feb. 23, 1976, by the assignee, *Pearl White Bletcher*, part interest.

Hereby enters this disclaimer to her entire interest in all claims of said patent.

[*Official Gazette June 1, 1976.*]